United States Patent [19]

Cavitt et al.

[11] Patent Number: 5,011,904

[45] Date of Patent: Apr. 30, 1991

[54] EPOXY RESIN COMPOSITIONS BASED ON ALKOXYLATED PHENOLS

[75] Inventors: Michael B. Cavitt, Lake Jackson; Dennis L. Steele; David J. Duncan, both of Freeport, all of Tex.

[73] Assignee: The Dow Chemical Company, Midland, Mich.

[21] Appl. No.: 439,211

[22] Filed: Nov. 20, 1989

[51] Int. Cl.$^5$ .................... C08G 59/06; C08G 59/08
[52] U.S. Cl. ............................. 528/103; 528/110; 525/481; 525/482; 525/507; 525/524
[58] Field of Search ............... 528/103, 110; 525/481, 525/482, 507

[56]  References Cited

U.S. PATENT DOCUMENTS

| | | | |
|---|---|---|---|
| 3,033,803 | 5/1962 | Price et al. | 260/2 |
| 3,033,820 | 5/1962 | Price et al. | 260/47 |
| 3,145,191 | 8/1964 | Perfetti | 260/47 |
| 3,470,110 | 9/1969 | Renner | 260/2 |
| 3,876,615 | 4/1975 | Vargiu et al. | 260/47 EP |
| 3,932,689 | 1/1976 | Watanabe et al. | 428/418 |
| 3,950,451 | 4/1976 | Suzuki et al. | 528/124 |
| 4,250,100 | 2/1981 | Bertram et al. | 260/348.14 |
| 4,419,265 | 12/1983 | Diery et al. | 252/331 |
| 4,507,461 | 3/1985 | Bowditch | 528/104 |
| 4,737,553 | 4/1988 | Gannon et al. | 525/481 |
| 4,835,225 | 5/1989 | Massingill, Jr. et al. | 525/481 |
| 4,845,172 | 7/1989 | Brytus et al. | 525/481 |
| 4,857,567 | 8/1989 | Laugal et al. | 523/415 |
| 4,863,575 | 9/1989 | Anderson et al. | 204/181.7 |
| 4,883,830 | 11/1989 | Kitabatake et al. | 528/103 |

OTHER PUBLICATIONS

Derwent Abstract 88-152736/22 (JP63/095218-A published Apr. 4, 1988).
Chem. Abs. 112: 8764d (1990).

Primary Examiner—Earl Nielsen
Assistant Examiner—Frederick Krass

[57]  ABSTRACT

Epoxy-containing compounds are prepared by dehydrohalogenating the reaction product of an epihalohydrin with the reaction product of a compound containing an average of more than one aromatic hydroxyl group per molecule with an alkylene oxide wherein the ratio of moles of epihalohydrin to hydroxyl groups is at least about 1.2:1. When these epoxy containing compounds are formulated into coatings, the resultant products have improved chemical resistance to acids.

13 Claims, No Drawings

EPOXY RESIN COMPOSITIONS BASED ON ALKOXYLATED PHENOLS

FIELD OF THE INVENTION

The present invention concerns epoxy resin compositions, curable compositions containing same and cured products thereof.

BACKGROUND OF THE INVENTION

It would be desirable to have a liquid epoxy resin that provides increased corrosion resistance, additional formulating time or pot-life, sprayable or paintable at ambient temperatures which maintains or exceeds the coating performance of conventional aromatic polyether polyepoxy resins.

Bowditch in U.S. Pat. No. 4,507,461 discloses epoxy resins prepared from the reaction of epichlorohydrin with the reaction product of a compound containing aromatic hydroxyl groups and an alkylene oxide so as to produce an aromatic compound containing aliphatic hydroxyl groups. The epichlorohydrin is reacted in amounts which provides a stoichiometric excess of 8 to 10 percent of the epichlorohydrin in relation to the equivalents of hydroxyl groups (this amounts to a ratio of moles of epichlorohydrin per aliphatic hydroxyl group of from 1.08:1 to 1.1:1). These epoxy resins are useful as diluents for other epoxy resins and in coating compositions. While coatings can be prepared from mixtures of these epoxy resins disclosed by Bowditch and epoxy resins prepared from epichlorohydrin and compounds having aromatic hydroxyl groups, the resultant coatings have less chemical resistance when coating compositions containing these epoxy resins are coated onto such substrates as treated or untreated steel or treated or untreated aluminum as compared to the chemical resistance of such substrates coated with like composition but without the epoxy resin disclosed by Bowditch.

It would therefore be desirable to have available low viscosity epoxy resins which when blended with other epoxy resins and formulated into a coating composition would result in a coating which provides better chemical resistance than that which is provided by the resins disclosed by Bowditch.

The present invention provides an epoxy resin which when blended with another epoxy resin and formulated into a coating composition provides cured coatings having an improvement in chemical resistance to acids. In addition, the present invention also provides a composition that allows for additional working time for the formulator resulting in greater flexibility and control to the applicator.

SUMMARY OF THE INVENTION

One aspect of the present invention pertains to a product having an average of more than one vicinal epoxide group per molecule which results from dehydrohalogenating the product resulting from reacting
  (1) the product resulting from reacting
    (a) at least one compound having an average of more than one aromatic hydroxyl group per molecule; with
    (b) at least one alkylene oxide having from 2 to about 4 carbon atoms per molecule in an amount which provides a ratio of moles of component (b) to aromatic hydroxyl groups contained in component (a) of from about 1:1 to about 8:1; with
  (2) at least one epihalohydrin wherein the ratio of moles of epihalohydrin per hydroxyl group contained in component (1) is from about 1.2:1 to about 1.7:1.

Another aspect of the present invention pertains to a product having an average of more than one vicinal epoxide group per molecule which results from dehydrohalogenating the product resulting from reacting
(A) a mixture of
  (1) the product resulting from reacting
    (a) at least one compound having an average of more than one aromatic hydroxyl group per molecule; with
    (b) at least one alkylene oxide having from 2 to about 4 carbon atoms per molecule in an amount which provides a ratio of moles of component (b) to aromatic hydroxyl groups contained in component (a) of from about 1:1 to about 8:1; and
  (2) at least one compound having an average of more than one aliphatic hydroxyl group per molecule which compound is free of aromatic rings, wherein components (1) and (2) are present in amounts such that from about 40 to about 70 percent of the hydroxyl groups are contributed by component (1) and from about 60 to about 30 percent of the hydroxyl groups are contributed by component (2), the percentages being based upon the total amount of hydroxyl groups contributed by components (1) and (2); with
(B) at least one epihalohydrin wherein the ratio of moles of epihalohydrin per hydroxyl group contained in components (A1) and (A2) is from about 1.08:1 to about 1.7:1.

Another aspect of the present invention pertains to an epoxy-containing composition which comprises a mixture of
(A) a product having an average of more than one vicinal epoxide group per molecule which results from dehydrohalogenating the product resulting from reacting
  (1) the product resulting from reacting
    (a) at least one compound having an average of more than one aromatic hydroxyl group per molecule; with
    (b) at least one alkylene oxide having from 2 to about 4 carbon atoms per molecule in an amount which provides a ratio of moles of component (b) to aromatic hydroxyl groups contained in component (a) of from about 1:1 to about 8:1; with
  (2) at least one epihalohydrin wherein the ratio of moles of epihalohydrin per hydroxyl group contained in component (1) is from about 1.2:1 to about 1.7:1; and
(B) at least one aromatic or cycloaliphatic based epoxy resin having an average of more than one vicinal epoxide group per molecule and having an average degree of polymerization of from about 1 to about 14 or any combination thereof.

Another aspect of the present invention pertains to an epoxy-containing composition which comprises a mixture of
(I) a product having an average of more than one vicinal epoxide group per molecule which results from dehydrohalogenating the product resulting from reacting (A) a mixture of
  (1) the product resulting from reacting
    (a) at least one compound having an average of more than one aromatic hydroxyl group per molecule; with
    (b) at least one alkylene oxide having from 2 to about 4 carbon atoms per molecule in an amount which provides a ratio of moles of component (b) to aromatic hydroxyl groups contained in component (a) of from about 1:1 to about 8:1; and
  (2) at least one compound having an average of more than one aliphatic hydroxyl group per molecule which compound is free of aromatic rings, wherein components (1) and (2) are present in amounts such that from about 30 to about 70 percent of the hydroxyl groups are contributed by component (1) and from about 70 to about 30 percent of the hydroxyl groups are contributed by component (2) the percentages being based upon the total amount of hydroxyl groups contributed by components (1) and (2); with
(B) at least one epihalohydrin wherein the ratio of moles of epihalohydrin per hydroxyl group contained in components (A1) and (A2) is from about 1.08:1 to about 1.7:1; and
(II) at least one aromatic or cycloaliphatic based epoxy resin having an average of more than one vicinal epoxide group per molecule and having an average degree of polymerization of from about 1 to about 14 or any combination thereof.

Another aspect of the present invention pertains to a curable composition comprising (A) a product having an average of more than one vicinal epoxide group per molecule which results from dehydrohalogenating the product resulting from reacting
  (1) the product resulting from reacting
    (a) at least one compound having an average of more than one aromatic hydroxyl group per molecule; with
    (b) at least one alkylene oxide having from 2 to about 4 carbon atoms per molecule in an amount which provides a ratio of moles of component (b) to aromatic hydroxyl groups contained in component (a) of from about 1:1 to about 8:1; with
  (2) at least one epihalohydrin wherein the ratio of moles of epihalohydrin per hydroxyl group contained in component (1) is from about 1.2:1 to about 1.7:1; and
(B) a curing amount of at least one curing agent or curing catalyst for component (A).

Another aspect of the present invention pertains to a curable composition comprising (I) a product having an average of more than one vicinal epoxide group per molecule which results from dehydrohalogenating the product resulting from reacting
(A) a mixture of
  (1) the product resulting from reacting
    (a) at least one compound having an average of more than one aromatic hydroxyl group per molecule; with
    (b) at least one alkylene oxide having from 2 to about 4 carbon atoms per molecule in an amount which provides a ratio of moles of component (b) to aromatic hydroxyl groups contained in component (a) of from about 1:1 to about 8:1; and
  (2) at least one compound having an average of more than one aliphatic hydroxyl groups per molecule which compound is free of aromatic rings, wherein components (1) and (2) are present in amounts such that from about 30 to about 70 percent of the hydroxyl groups are contributed by component (1) and from about 70 to about 30 percent of the hydroxyl groups are contributed by component (2) based on the total amount of hydroxyl groups contained in components (1) and (2); with
(B) at least one epihalohydrin wherein the ratio of moles of epihalohydrin per hydroxyl group contained in component (A1) and (A2) is from about 1.08:1 to about 1.7:1; and
(II) a curing amount of at least one curing agent or curing catalyst for component (I).

Another aspect of the present invention pertains to a curable composition comprising (A) a product having an average of more than one vicinal epoxide group per molecule which results from dehydrohalogenating the product resulting from reacting
  (1) the product resulting from reacting
    (a) at least one compound having an average of more than one aromatic hydroxyl group per molecule; with
    (b) at least one alkylene oxide having from 2 to about 4 carbon atoms per molecule in an amount which provides a ratio of moles of component (b) to aromatic hydroxyl groups contained in component (a) of from about 1:1 to about 8:1; with
  (2) at least one epihalohydrin wherein the ratio of moles of epihalohydrin per hydroxyl group contained in component (1) is from about 1.2:1 to about 1.7:1;
(B) at least one aromatic or cycloaliphatic based epoxy resin having an average of more than one vicinal epoxide group per molecule and having an average degree of polymerization of from about 1 to about 14; and
(C) a curing amount of at least one curing agent or curing catalyst for components (A) and (B).

Another aspect of the present invention pertains to a curable composition comprising (I) a product having an average of more than one vicinal epoxide group per molecule which results from dehydrohalogenating the product resulting from reacting
(A) a mixture of
  (1) the product resulting from reacting
    (a) at least one compound having an average of more than one aromatic hydroxyl group per molecule; with
    (b) at least one alkylene oxide having from 2 to about 4 carbon atoms per molecule in an amount which provides a ratio of moles of component (b) to aromatic hydroxyl groups contained in component (a) of from about 1:1 to about 8:1; and (2) at least one compound having an average of more than one aliphatic hydroxyl groups per molecule which compound is free of aromatic rings, wherein components (1) and (2) are present in amounts such that from about 30 to about 70 percent of the hydroxyl groups are contributed by component (1) and from about 70 to about 30 percent of the hydroxyl groups are contributed by component (2) based upon the total amount of hydroxyl groups contributed by components (1) and (2); with (B) at least one epihalohydrin wherein the ratio of moles of epihalohydrin per hydroxyl group contained in components (A1) and (A2) is from about 1.08:1 to about 1.7:1;

(II) at least one aromatic or cycloaliphatic based epoxy resin having an average of more than one vicinal epoxide group per molecule and having an average degree of polymerization of from about 1 to about 14; and (III) a curing amount of at least one curing agent or curing catalyst for components (I) and (II).

Another aspect of the present invention pertains to the product resulting from curing the aforementioned curable compositions.

DETAILED DESCRIPTION OF THE INVENTION

An oxyalkylated aromatic compound is prepared by reacting at least one compound having an average of more than one phenolic hydroxyl group per molecule with at least one alkylene oxide having from about 2 to about 4 carbon atoms per molecule at a temperature suitably from about 140° C. to about 230° C., more suitably from about 150° C. to about 200° C., most suitably from about 150° C. to about 190° C. for a time sufficient to complete the reaction, suitably from about 2 to about 48, more suitably from about 2 to about 24, most suitably from about 4 to about 20, hours.

At temperatures above about 230° C., undesired side reactions may take place or an uncontrollable reaction rate may be obtained resulting in a potentially hazardous condition.

At temperatures below about 140° C., the phenolic hydroxyl groups may not melt and thus be difficult to mix and/or react in a uniform manner.

The reaction can be conducted at any suitable pressure which will keep the more volatile reactants in liquid form at the reaction temperature employed. Atmospheric to superatmospheric pressures up to about 200 psia (1379 kPa) are usually employed. It is preferred to employ pressures of from about 15 psia (103kPa) to about 100 psia (689 kPa).

The components are employed in amounts which provide a ratio of the moles of alkylene oxide per aromatic hydroxyl group of from about 1:1 to about 8:1, from about 1:1 to about 4:1, more suitably from about 1.2:1 to about 3:1, most suitably from about 1.25:1 to about 2.5:1.

At ratios of the moles of alkylene oxide per aromatic hydroxyl group below about 1:1, unreacted aromatic hydroxyl groups remain which may cause processing problems and lower product yields.

At ratios above about 8:1, the final coating performance is lowered.

Suitable aromatic hydroxyl-containing compounds which can be employed herein include any compound containing an average of more than one aromatic hydroxyl group per molecule. Those compounds having two aromatic hydroxyl groups per molecule such as dihydroxy benzene, biphenols and bisphenols are preferred. Suitable such compounds include those represented by the following general formulas I, II or III

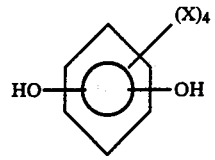

Formula I wherein each A is independently a divalent hydrocarbyl group having suitably from 1 to about 12, more suitably from about 1 to about 6, most suitably from 1 to about 4, carbon atoms, -S-, -S-S-, -SO-, SO2-, -O- or -CO-; each A' is independently a divalent hydrocarbyl group

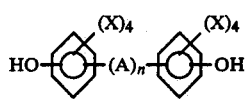

Formula II

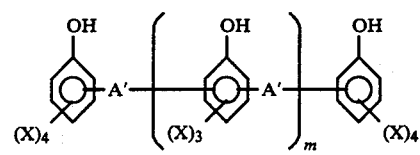

Formula III having suitably from 1 to about 12, more suitably from about 1 to about 6, most suitably from 1 to about 4, carbon atoms each X is independently hydrogen, a hydrocarbyl or hydrocarbyloxy group having suitably from 1 to about 12, more suitably from about 1 to about 6, most suitably from 1 to about 4, carbon atoms, or a halogen, preferably chlorine or bromine; m has an average value suitably from 0.01 to about 6, more suitably from about 0.01 to about 4, most suitably from about 0.1 to about 4; and n has a value of zero or 1.

Particularly suitable aromatic hydroxylcontaining compounds include, for example, resorcinol, hydroquinone, catechol, biphenol, bisphenol A (4,4'-isopropylidine diphenol), bisphenol K (4,4'-dihydroxybenzophenone), bisphenol S (4,4'-dihydroxydiphenylsulfone), bisphenol F (4,4'-dihydroxydiphenylmethane), bisphenol AP (4,4'-(1-phenylethylidene)diphenol), phenol-aldehyde novolac resins, particularly phenol-formaldehyde resins having an average functionality suitably from about 0.01 to about 6, more suitably from about 0.01 to about 4, most suitably from about 0.1 to about 4.

Suitable alkylene oxides which can be employed to react with the aromatic hydroxyl-containing compound include, for example, ethylene oxide, propylene oxide, butylene oxide, any combination thereof and the like.

The resultant alkoxylated aromatic compound is then reacted with an epihalohydrin at a temperature suitably from about 50 to about 90, more suitably from about 55 to about 80, most suitably from about 60 to about 70 for a time sufficient to complete the reaction, suitably from about 1 to about 6, more suitably from about 1 to about 4, most suitably from about 1.5 to about 3, hours at pressures from atmospheric to superatmospheric, usually up to about 100 psia (689 kPa), more suitably from about 15 psia (103 kPa) to about 50 psia (344 kPa), most suitably from about 15 psia (103 kPa) to about 30 psia (206 kPa) and the components are employed in a ratio of moles of epihalohydrin per hydroxyl group contained in the above reaction product suitably from about 1.2 to about 1.7, more suitably from about 1.3 to about 1.7, most suitably from about 1.3 to about 1.5.

At temperatures above about 90° C, the reaction is difficult to control and has the possibility of having an uncontrollable exothermic reaction if heat energy cannot be removed efficiently.

At temperatures below about 50° C, the viscosity of the oxyalkylated aromatic hydroxyl-containing compound may be too high to allow mixing or mixing may even be impossible.

At mole ratios below about 1.2:1, coatings prepared from the dehydrohalogenated product does not have the good acid resistance property.

Suitable epihalohydrins which can be employed herein include, for example, epichlorohydrin, epibromohydrin, epiiodohydrin, methylepichlorohydrin, methylepibromohydrin, methylepiiodohydrin, ethylepichorohydrin, ethylepibromohydrin, ethylepiiodohydrin, propylepichorohydrin, propylepibromohydrin, propylepiiodohydrin, butylepichorohydrin, butylepibromohydrin, butylepiiodohydrin, any combination thereof and the like.

If desired, before reacting the oxyalkylated aromatic compound with an epihalohydrin, it can be mixed with a compound having an average of more than one aliphatic hydroxyl group per molecule which compound is free of aromatic rings. Suitable such compounds having an average of more than one aliphatic hydroxyl group per molecule and which is free of aromatic rings which can be employed herein, include, ethylene glycol, propylene glycol, diethylene glycol, dipropylene glycol, tripropylene glycol, 1,4-butanediol, 1,6-hexanediol, polyoxypropylene glycol, polyoxybutylene glycol, glycerine, 1,2,3-trihydroxybutane, 1,2,4trihydroxybutane, trimethylol propane, neopentyl glycol, dibromoneopentyl glycol, cyclohexane dimethanol, any combination thereof and the like. While any of the aliphatic hydroxyl-containing compounds free of aromatic rings are suitable, it is preferred to employ those which are monomeric. i.e. those which are essentially free of ether groups. It is also preferred to employ those which have an average of more than two aliphatic hydroxyl groups per molecule. These compounds can be blended in amounts such that from about 30 to about 70, preferably from about 35 to about 70, more preferably from about 40 to about 67 percent of the hydroxyl groups are contributed by the oxyalkylated aromatic compound and from about 70 to about 30, preferably from about 65 to about 30, more preferably from about 60 to about 33, percent of the hydroxyl groups are contributed by the aliphatic hydroxyl group-containing compound which is free of aromatic rings, the percentages being based upon the total amount of hydroxyl groups contributed by the hydroxyl group-containing compounds.

When an epihalohydrin is reacted with such a mixture, it is employed in an amount which provides a ratio of moles of epihalohydrin per hydroxyl group suitably from about 1.08:1 to about 1.7:1, more suitably from about 1.2:1 to about 1.7:1, most suitably from about 1.3:1 to about 1.5:1.

At ratios below about 1.08:1, the resultant cured coating does not have the desired improved acid resistance.

At ratios above about 1.7:1, the yield to desirable product may be undesirably decreased.

The reaction between the epihalohydrin and the alkoxylated aromatic compound(s) or mixture of such compound(s) and aliphatic hydroxyl-containing compound(s) is usually conducted in the presence of a catalyst. Suitable such catalysts are Lewis acid catalysts. Suitable Lewis acid catalysts include, for example, stannic chloride, boron trifluoride, boron trifluoride complexed with ethers or amines, any combination thereof and the like so long as the catalyst does not cause an undesired effect on the final epoxy resin. The catalyst is usually employed in amounts of from about 0.002 to about 0.02, more usually from about 0.003 to about 0.018, most usually from about 0.003 to about 0.016, mole of catalyst per hydroxyl equivalent.

Other processes are known that will couple epihalohydrin to an alcohol such as the process known as phase transfer catalysis. Suitable catalysts that can be employed in this process include, for example, benzyltrimethyl ammonium chloride, benzyltriethyl ammonium chloride, benzyltrimethyl ammonium hydroxide, tetrabutyl ammonium chloride, and the like.

In the phase transfer method, the quantity of catalyst varies with the reactants, catalyst and reaction conditions, however the catalyst can be employed in amounts of from about 0.5 to about 7; more suitably from about 1 to about 6; most suitable from about 2 to about 5, percent by weight of catalyst based on the weight of hydroxyl-containing compound employed.

The product resulting from reacting the epihalohydrin with the aliphatic hydroxyl-containing compound or compounds is then dehydrohalogenated with a basic acting compound to form the vicinal epoxycontaining compound. Suitable basic acting compounds which can be employed herein as the dehydrohalogenating agent include, for example, alkali metal and alkaline earth metal hydroxides, combinations thereof and the like. Preferred dehydrohalogenating agents are the alkali metal hydroxides, particularly sodium hydroxide. The dehydrohalogenating agents are employed in amounts which provide from about 0.97 to about 3, more suitably from about 1 to about 2, most suitably from about 1 to about 1.6 moles of dehydrohalogenating agent per halohydrin group contained in the reaction product resulting from reacting the oxyalkylated aromatic compound or mixture of oxyalkylated aromatic compound and compound having an average of more than two aliphatic hydroxyl groups per molecule.

At amounts less than about 0.97 mole of dehydrohalogenating agent per halohydrin group incomplete reaction will occur causing decreased product yields.

At amounts more than about 3 moles of dehydrohalogenating agent per halohydrin group the possibility for oligomer formation is increased which results in potentially decreased product yields.

The resultant epoxy compounds can be blended with aromatic or cycloaliphatic based epoxy resins having an average degree of polymerization of from about 1 to about 14, more suitably from about 1 to about 6, most suitably from about 1 to about 3, and an average functionality of from greater than 1 to about 3, preferably from about 1.5 to about 2.2, more preferably from about 1.75 to about 2.1.

By degree of polymerization, it is meant the average number of repeatable groups plus 1 present in the epoxy resin.

For purposes of further clarification of what is meant by degree of polymerization, in Formulas IV to IX enumerated below, when m' and n' have values of zero, the epoxy resin has a degree of polymerization of 1; likewise, when they have average values of 0.1, 0.5, 1, 2, etc., the degree of polymerization is 1.1, 1.5, 2, 3, etc.

What is meant by the term aromatic or cycloaliphatic based epoxy resins, it is meant that the glycidyl ether group is attached to a carbon atom in an aromatic or benzene ring or a cycloaliphatic ring.

Suitable such aromatic or cycloaliphatic based epoxy resins which can be employed herein include, for example, those represented by the following Formulas IV, V, VI, VII, VIII or IX about 1 to about 6, most suitably from 1 to about 4, carbon atoms; each R is independently hydrogen or an alkyl group having from 1 to about 4 carbon atoms; each X is independently hydrogen, a hydrocarbyl or hydrocarbyloxy group having suitably from 1 to about 12, more suitably from about 1 to about 6, most suitably from 1 to about 4, carbon atoms, or a halogen, preferably chlorine or bromine; m' has an average value suitably from 0.01 to about 6, more suitably from about 0.01 to about 4, most suitably from about 0.1 to about 4; n has a value of zero or 1; and n' has an average value suitably from about zero to about 13, more suitably from zero to Formula IV
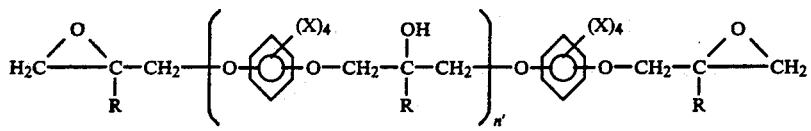

Formula V
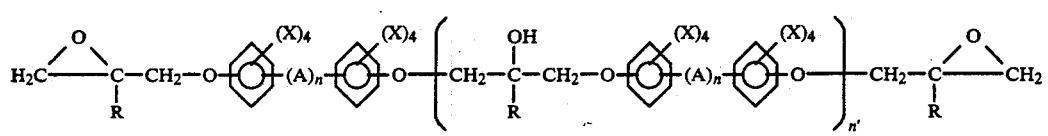

Formula VI
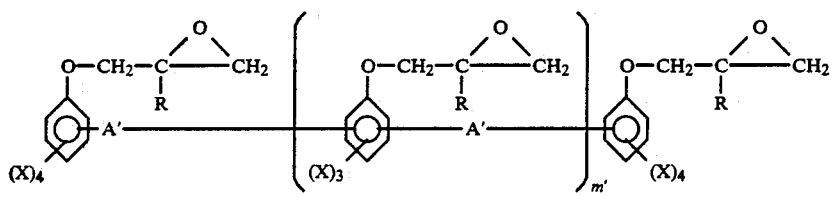

Formula VII
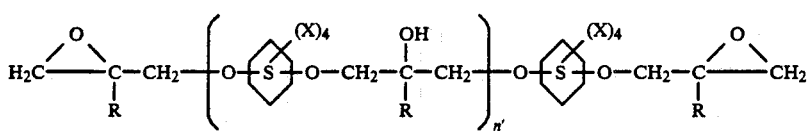

Formula VIII
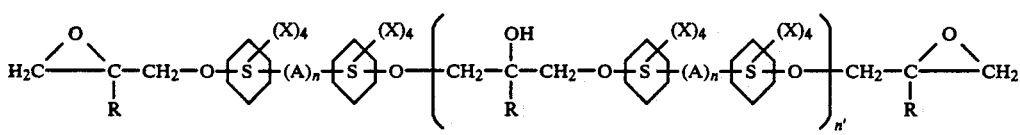

wherein each A is independently a divalent hydrocarbyl

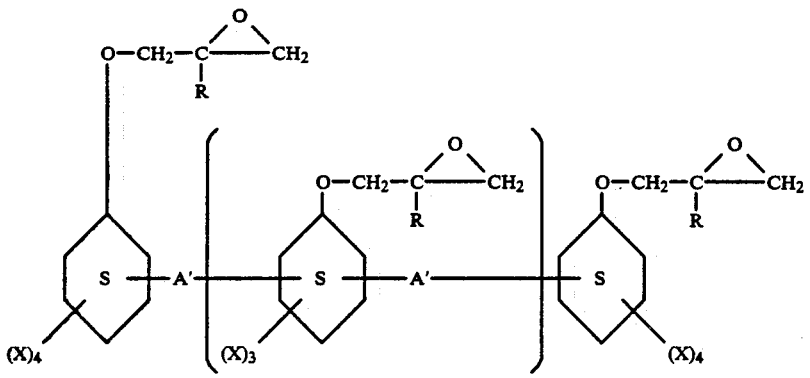

group having suitably from 1 to about 12, more suitably from about 1 to about 6, more suitably from 1 to about 4, carbon atoms, -S-, -S-S-, -SO-, SO$_2$-, -O- or -CO-; each A' is independently a divalent hydrocarbyl group having suitably from 1 to about 12, more suitably from about 5, most suitably from zero to about 2.

Particularly suitable epoxy resins which can be blended with the other epoxy-containing compounds include, for example, the diglycidyl ethers of biphenol, bisphenol A, bisphenol F, bisphenol K, bisphenol S, bisphenol AP, hydrogenated biphenol, hydrogenated bisphenol A, hydrogenated bisphenol F, hydrogenated bisphenol K, hydrogenated bisphenol S, hydrogenated bisphenol AP; polyglycidyl ethers of phenol- or cyclohexanol-aldehyde novolac resins, combinations thereof and the like.

The blends suitably contain from about 20 to about 80, more suitably from about 30 to about 70, most suitably from about 35 to about 65, percent by weight glycidyl ether of aliphatic hydroxyl-containing compound(s) and from about 80 to about 20, more suitably from about 70 to about 30, most suitably from about 65 to about 35, percent by weight aromatic or cycloaliphatic based epoxy resin all percentages being based upon the combined weight of the epoxy-containing compounds.

The epoxy-containing compounds can be cured with any suitable curing agent or curing catalyst. Suitable such curing agents or curing catalysts are disclosed by Lee and Neville in *Handbook of Epoxy Resins*, McGraw-Hill, (1967), in *EPOXY RESINS Chemistry and Technology*, Edited by Clayton A. May, Marcel Dekker, Inc. (1988), both of which are incorporated herein by reference. Suitable such curing agents include, for example, primary and secondary aliphatic, cycloaliphatic or aromatic amines, polyalkylene polyamines, polycarboxylic acids and anhydrides thereof, polysulfides, compounds having a plurality of aromatic hydroxyl groups, polyamides, guanidines, biguanides, combinations thereof and the like. Particularly suitable curing agents include, for example, ethylenediamine, 1,3-prpanediamine, 1,6-hexanediamine, diethylenetriamine, triethylenetetramine, 1,3-diaminocyclohexane, N-aminoethylpiperazine, 4,4'-methylenedianiline, diaminodiphenylsulfone, amidoamines obtained from the reaction of fatty acids with polyamines, aminated polypropylene glycol, polyamine adducts of the diglycidyl ether of bisphenol A, polyamine adducts of the diglycidyl ether of bisphenol F, dicyanidamide, phthalic anhydride, terephthalic acid, NADIC methyl anhydride, any combination thereof and the like.

The following examples are illustrative of the present invention, but are not to be construed as to limiting the scope thereof in any manner.

The following components are employed in the examples.

ALCOHOL A is a dialcohol of the reaction product of about 3.4 moles of propylene oxide with about 1 mole of bisphenol A resulting in a hydroxyl equivalent weight (HEW) of 214.1.

ALCOHOL B is trimethanol propane having a HEW of 44.7.

ALCOHOL C is a dialcohol of the reaction product of about 4 moles of butylene oxide with about 1 mole of bisphenol A resulting in a HEW of 268.1.

EPOXY RESIN A is a diglycidyl ether of bisphenol A having an epoxy equivalent weight (EEW) of 171.7.

EPOXY RESIN B is a diglycidyl ether of bisphenol A having an EEW of 172 that has been reacted with 0.0233 equivalent of pelargonic acid, 0.018 equivalent of lauric acid and 0.016 equivalent of myristic acid resulting in an epoxy resin having an EEW of 198.

AMINE A is an amine available from Henkel Corp. as GENAMID 235 having an amine hydrogen equivalent weight (AHEW) of 95.

AMINE B is a curing agent containing aliphatic primary and secondary amine groups available from The Dow Chemical Company as D.E.H. ™ 52 Epoxy Hardener having an AHEW of 44.5.

EXAMPLE 1

A. Mole Ratio of Epihalohydrin to OH Groups of 1.152:1 (Not an Example of the Present Invention)

To a reaction vessel equipped with a nitrogen purge, stirrer, temperature control and condenser is added 400 gms (1.8683 alcohol equiv.) of ALCOHOL A and 7.48 gms (0.0287 mole) of stannic chloride at 50° C. The temperature of the mixture is increased to 60° C. whereupon 199.08 gm (2.1522 moles) of epichlorohydrin is added over a time period of 1.58 hours. After the epichlorohydrin addition is complete, the reaction mixture is digested for 0.75 hours at 65° C. Methyl isobutyl ketone, 400 gms, is added and at a temperature of 85° C. add 95.6 gms of water and 95.6 gms of 50 weight percent sodium hydroxide. The temperature decreases to 56° C. Heat the reaction mixture to 85° C. and maintain for 2.67 hours then let the two phases separate. Remove the aqueous phase and add 78 gms of water and 78 gms of 50 weight percent sodium hydroxide. Increase the temperature to 85° C. and maintain for 2 hours. Let the two phases separate then remove the aqueous phase. Repeat the previous step. After the separation, add 1400 gms of methyl isobutyl ketone and wash the organic phase with water to a neutral pH. This washing step employs three water treatments of 600 gms of water each time. The resulting solution is vacuum distilled to remove the solvent and residual water yielding 491 gms of product. The resulting product gives a percent epoxide of 12.36, percent total chloride of 2.76 and a hydrolyzable chloride of 109 ppm.

B. Mole Ratio of Epihalohydrin to OH Groups of 1.286:1

To a reaction vessel equipped with a nitrogen purge, stirrer, temperature control and condenser is added 527.9 gms (2.4657 OH equiv.) of ALCOHOL A and 3.0 gms (0.0115 mole) of stannic chloride at 30° C. The temperature of the mixture is increased to 60° C. whereupon 293.4 gm (3.1719 moles) of epichlorohydrin is added over a time period of 1.17 hours. After the epichlorohydrin addition is complete, the reaction mixture is digested for 0.75 hours at 65° C. Methyl isobutyl ketone, 548 gms, is added and at a temperature of 85° C. add 130 gms of water and 130 gms of 50 weight percent sodium hydroxide. The temperature decreases to 70° C. Heat the reaction mixture to 85° C. and maintain for 1.98 hours then let the two phases separate. Remove the aqueous phase then add 120 gms of water and 120 gms of 50 weight percent sodium hydroxide. Increase the temperature to 85° C. and maintain for 2 hours. Let the two phases separate then remove the aqueous phase. After the separation, add 1916 gms of methyl isobutyl ketone and wash the organic phase with water to a neutral pH. This washing step employs three water treatments of 800 gms of water each time. The resulting solution is vacuum distilled to remove the solvent and residual water yielding 763.8 gms of product. The resulting product gives a percent epoxide of 12.82, percent total chloride of 4.1 and a hydrolyzable chloride of 48 ppm.

C. Mole Ratio of Epihalohydrin to OH Groups of 1.5:1

To a reaction vessel equipped with a nitrogen purge, stirrer, temperature control and condenser is added 464.7 gms (2.1705 alcohol equiv.) of ALCOHOL A and 5.0 gms (0.0192 mole) of stannic chloride at 24° C. The temperature of the mixture is increased to 60° C. whereupon 301.2 gm (3.2562 moles) of epichlorohydrin is added over a time period of 1.03 hours maintaining a temperature between 60° C. to 80° C. After the epichlorohydrin addition is complete, the reaction mixture is digested for 0.75 hours at 60° C. Methyl isobutyl ketone, 510.5 gms, is added and at a temperature of 80° C. add 130 gms of water and 130 gms of 50 weight percent sodium hydroxide. Heat reaction mixture of 80° C. and maintain for 2 hours then let the two phrases separate. Remove the aqueous phase then add 130 gms of water and 130 gms of 50 weight percent sodium hydroxide. Increase the temperature to 80° C. and maintain for 1.98 hours. Let the two phases separate then remove the aqueous phase then add 130 gms of water and 130 gms of 50 weight sodium hydroxide. Increase the temperature to 80° C. and maintain for 3.08 hours. Let the two phases separate then remove the aqueous phase. After the separation, add 1787 gms of methyl isobutyl ketone and wash the organic phase with water to a neutral pH. This washing step employs three water treatments of 766 gms of water each time. The resulting solution is vacuum distilled to remove the solvent and residual water. The resulting product gives a percent epoxide of 12.97, percent total chloride of 5.49 a hydrolyzable chloride of 36 ppm.

D Mole Ratio of Epihalohydrin to OH Groups of 1.7:1

To a reaction vessel equipped with a nitrogen purge, stirrer, temperature control and condenser is added 464.7 gms (2.1705 alcohol equiv.) of ALCOHOL A and 5.0 gms (0.0192 mole) of stannic chloride at 27° C. The temperature of the mixture is increased to 60° C. whereupon 341.3 gm (3.6897 moles) of epichlorohydrin is added over a time period of 1.08 hours. After the epichlorohydrin addition is complete, the reaction mixture is digested for 0.75 hours at 60° C. Methyl isobutyl ketone, 537 gms, is added and at a temperature of 80° C. add 148 gms of water and 148 gms of 50 weight percent sodium hydroxide. The temperature decreases to 68° C. Heat the reaction mixture to 80° C. and maintain for 2 hours then let the two phases separate. Remove the aqueous phase then add 148 gms of water and 148 gms of 50 weight percent sodium hydroxide. Increase the temperature to 80° C. and maintain for 2 hours. Let the two phases separate then remove the aqueous phase then add 148 gms of water and 148 gms of 50 weight percent sodium hydroxide. Increase the temperature to 80° C. and maintain for 3 hours. Let the two phases separate then remove the aqueous phase. After the separation, add 1881 gms of methyl isobutyl ketone and wash the organic phases with water to a neutral pH. This washing step employs three water treatments of 800 gms of water each time. The resulting solution is vacuum distilled to remove the solvent and residual water. The resulting product gives a percent epoxide of 12.71, percent total chloride of 6.89 and hydrolyzable chloride of 3 ppm.

EXAMPLE 2

(Mixture of Aliphatic OH Compounds; 65.15% of OH Groups Contributed by Oxyalkylated Aromatic Compound; Mole Ratio of Epihalohydrin:OH of 1.289:1)

To a reaction vessel equipped with a nitrogen purge, stirrer, temperature control and condenser is added 315 gms (1.4713 alcohol equiv.) of ALCOHOL A, 35 gms (0.7829 alcohol equiv.) of ALCOHOL B, and 2.6 gms (0.0099 mole) of stannic chloride at ambient temperature. The temperature of the mixture is increased to 60° C. whereupon 268.7 gm (2.9048 moles) of epichlorohydrin is added over a time period of 0.9 hour. After the epichlorohydrin addition is complete, the reaction mixture is digested for 0.75 hours at 65° C. Methyl isobutyl ketone, 412.5 gms, is added and at a temperature of 58° C. add 230 gms of water and 230 gms of 50 weight percent sodium hydroxide. Heat the reaction mixture to 85° C. and maintain for three hours then let the two phases separate. Remove the aqueous phase and add 120 gms of water and 120 gms of 50 weight percent sodium hydroxide. Increase the temperature to 85° C. and maintain for 2 hours. Let the two phases separate then remove the aqueous phase. After the separation, add 1443.6 gms of methyl isobutyl ketone and wash the organic phase with water to a neutral pH. This washing step employs eight water treatments of 600 gms of water each time. The resulting solution is vacuum distilled to remove the solvent and residual water yielding 573 gms of product. The resulting product gives a percent epoxide of 15.74, percent total chloride of 4.49 and a hydrolyzable chloride of 195 ppm.

EXAMPLE 3

(Mixture of Aliphatic OH Compounds; 45.38% of OH Groups Contributed by Oxyalkylated Aromatic Compound; Mole Ratio of Epihalohydrin:OH of 1.303:1)

To a reaction vessel equipped with a nitrogen purge, stirrer, temperature control and condenser is added 320 gms (1.4946 alcohol equiv.) of ALCOHOL A, 80 gms (1.7897 alcohol equiv.) of ALCOHOL B, and 3.3 gms (0.0127 mole) of stannic chloride at ambient temperature. The temperature of the mixture is increased to 60° C. whereupon 395 gm (4.2703 moles) of epichlorohydrin is added over a time period of 1.58 hour. After the epichlorohydrin addition is complete, the reaction mixture is digested for 0.75 hours at 65° C. Methyl isobutyl ketone, 530 gms, is added and at a temperature of 75° C. add 345 gms of water and 345 gms of 50 weight percent sodium hydroxide. Heat the reaction mixture to 70° C. and maintain for three hours then let the two phases separate. Remove the aqueous phase and add 170 gms of water and 170 gms of 50 weight percent sodium hydroxide. Increase the temperature to 85° C. and maintain for 1.92 hour. Let the two phases separate then remove the aqueous phase. After the separation, add 1855 gms of methyl isobutyl ketone and wash the organic phase with water to a neutral pH. This washing step employs ten water treatments of 800 gms of water each time. The resulting solution is vacuum distilled to remove the solvent and residual water yielding 723 gms of product. The resulting product gives a percent epoxide of 18.57, percent total chloride of 5.71 and a hydrolyzable chloride of 205 ppm.

EXAMPLE 4

(Mole Ratio of Epihalohydrin:OH of 1.291:1)

To a reaction vessel equipped with a nitrogen purge, stirrer, temperature control and condenser is added 449 gms (1.6747 alcohol equiv.) of ALCOHOL C and 4.9 gms (0.0188 mole) of stannic chloride at ambient temperature. The temperature of the mixture is increased to 60° C. whereupon 200 gm (2.1622 moles) of epichlorohydrin is added over a time period of 0.6 hour. After the epichlorohydrin addition is completed, the reaction mixture is digested for 0.73 hours at 65° C. Methyl isobutyl ketone, 430 gms, is added and at a temperature of 64° C. add 99 gms of water and 99 gms of 50 weight percent sodium hydroxide. Heat the reaction mixture to 85° C. and maintain for three hours then let the two phases separate. Remove the aqueous phase and add 81 gms of water and 81 gms of 50 weight percent sodium hydroxide. Increase the temperature to 85° C. and maintain for 2 hours. Let the two phases separate then remove the aqueous phase. Remove the aqueous phase and add 81 gms of water and 81 gms of 50 weight percent sodium hydroxide. Increase the temperature to 85° C. and maintain for 2.3 hours. Let the two phases separate then remove the aqueous phase. Repeat the last step one more time. After the separation, add 1500 gms of methyl isobutyl ketone and wash the organic phase with water to a neutral pH. This washing step employs three water treatments of 600 gms of water each time. The resulting solution is vacuum distilled to remove the solvent and residual water yielding 608 gms of product. The resulting product gives a percent epoxide of 11.01, percent total chloride of 3.62 and a hydrolyzable chloride of 70 ppm.

EXAMPLE 5

The gelation time is determined by mixing the epoxy resins with the amines at an equivalent ratio of 1:1 giving a total of 100 gms. The results are shown in Table I.

TABLE I

| Sample | Curing Agent | Epoxy Resin Type | Epoxy Resin Grams | Cure Time in Hours |
|---|---|---|---|---|
| A* | Amine | 1A | 88.42 | 6.06 |
| B | Amine B | 1B | 88.25 | 16.38 |

*Not an example of the present invention.

EXAMPLE 6

Coating formulations are prepared from some of the epoxy compositions prepared above and tested for gloss and corrosion (chemical) resistance. The coating formulations are prepared by adding the epoxy resins to a one quart (0.946 l) metal container, adding the fillers, additives and solvents. After blending the mixture, the curing agent is added and blended. The resultant coating is then applied to a cold rolled steel substrate using a pull-down-bar to a wet film thickness of 6 mils (0.1524 mm). The coated panels are then cured at ambient temperature for seven days.

The resultant cured panels are then tested for Chemical Resistance The coated cold rolled steel panel is prepared for testing in the following manner.

A rubber gasket measuring 63 mm O.D.×38 mm I.D.×3 mm long is affixed to the pigmented coating surface using a rubberized cement. This is allowed to set, then the test acid is placed inside the cut-out gasket covering the exposed coating surface. A glass cover is then placed on top of the gasket and sealed with high viscosity grease. The appearance of the coating is viewed through the glass cover to determine when the coating failure occurs. A coating failure occurs when the coating begins to delaminate or bubbles or blisters are noted.

The formulation and results are given in Table II.

TABLE II

| Component & Property | Sample Designation | | | |
|---|---|---|---|---|
| | A* | B | C | D |
| Epoxy Resin | | | | |
| Type/grams | B/50 | B/50 | B/50 | B/50 |
| Type/grams | Ex 1A/50 | Ex 1B/50 | Ex 2/50 | Ex 3/50 |
| Amine B, gms. | 17.64 | 18.02 | 19.52 | 20.99 |
| $TiO_2$, gms. | 86.6 | 86.6 | 86.6 | 86.6 |
| $BaSO_4$, gms. | 200 | 200 | 200 | 200 |
| Bentone SD-3$^a$, gms. | 3 | 3 | 3 | 3 |
| BYK 310$^b$, gms. | 1.5 | 1.5 | 1.5 | 1.5 |
| BYK 052$^c$, gms. | 1.5 | 1.5 | 1.5 | 1.5 |
| Methyl Isobutyl Ketone, gms. | 10.16 | 10.64 | 9.84 | 9.28 |
| Methyl Ethyl Ketone, gms. | 20.32 | 21.28 | 19.68 | 18.56 |
| Butanol, gms. | 33.02 | 34.58 | 31.98 | 30.16 |
| Corrosion Resist. to $HNO_3$, time to failure in days | 5 | 7 | 5 | 5 |
| Corrosion Resist. to Glacial Acetic Acid, time to failure | 2.40 | 2.64 | 3.60 | 7.92 |

TABLE II-continued

| Component & Property | Sample Designation | | | |
|---|---|---|---|---|
| | A* | B | C | D |
| in hours | | | | |

*Not an example of the present invention.
[a]Bentone SD-3 is an organoclay commercially available from NL Industries employed as a rheological control additive.
[b]BYK310 is a heat resistance silicone additive commercially available from BYK Chemie employed to improve leveling, increased surface slip, reduced cratering and prevent Benart cell formation.
[c]BYK 052 is a defoamer additive commercially available from BYK CHemie.

EXAMPLE 7

Mole Ratio of Epihalohydrin to OH Groups of 1.1:1 with 10% ALCOHOL B

To a reaction vessel equipped with a nitrogen purge, stirrer, temperature control and condenser is added 489.6 gms (2.2868 alcohol equiv.) of ALCOHOL A, 54.4 gms (1.217 alcohol equiv.) of ALCOHOL B, and 6 gms (0.0228 mole) of stannic chloride at 60° C. whereupon 356.5 gm (3.8541 moles) of epichlorohydrin is added over a time period of 1.75 hours. After the epichlorohydrin addition is complete, the reaction mixture is digested for 0.75 hour at 65° C. Methyl isobutyl ketone, 600.4 gms, is added and after raising the temperature to 80° C., 308 gms of water and 308 gms of 50 weight percent sodium hydroxide are added. The temperature of 80° C. is maintained for 3.07 hours. The reaction mixture is then allowed to separate into two phases. The aqueous phase is removed and 154 gms of water and 154 gms of weight percent sodium hydroxide are added. The temperature is increased to 80° C. and maintained for 2 hours. The reaction mixture is allowed to separate into two phases and the aqueous phase removed. After the separation, 2101 gms of methyl isobutyl ketone are added and the organic phase is washed with water to a neutral pH. This washing step employs three water treatments of 890 gms of water each time. The resulting solution is vacuum distilled to remove the solvent. The resulting product gives a percent epoxide of 5.27, percent total chloride of 0.33 and a hydrolyzable chloride of 1 ppm.

COATING RESULTS

Coatings are prepared by blending the components listed in the following Table III.

TABLE III

| Sample Number | Resin 1 (gms) | Resin 2 (gms) | Curing Agent (DEH 58) (gms) |
|---|---|---|---|
| A* | 30 gms of Example 1A | 0 | 2.57 |
| B | 30 gms of Example 1B | 0 | 2.65 |
| C* | 15 gms of Example 1A | 15.2 gms Epoxy Resin A | 3.92 |
| D | 15 gms of Example 1B | 15.3 gms Epoxy Resin A | 3.97 |

*Not an example of the present invention.

Samples A and B are allowed to stand at ambient temperature (25° C.) for 1.25 hours and Samples C and D are allowed to stand at ambiet temperature at 25° C. for .25 hour prior to coating onto 4"×12"×24 guage (101.6 mm×304,8 mm×0.63 mm) untreated cold rolled steel panels. The panels are cured at ambient temperature for three (3) days prior to testing.

Chemical resistance is determined using the unpigmented panels coated with the unpigmented coating formulations after curing. To the cured, coated panel is placed about 1-2 ml of glacial acetic acid and a timer started. The coating is observed for delamination, bubbles or blisters. The surface is maintained wet with glacial acetic acid by the addition of more acid as needed. The results are given in the following Table IV.

TABLE IV

| Sample Number | Thickness (Mil/mm) | Glacial Acetic Acid Resistance (sec) |
|---|---|---|
| A* | 0.72/0.018 | 107 |
| B | 0.83/0.021 | 177 |
| C* | 1.83/0.046 | 246 |
| D | 2.10/0.053 | 337 |

*Not an example of the present invention.

Samples A and B are allowed to stand at ambiet temperature (25° C.) for 1.25 hours and Samples C and D are allowed to stand at ambiet temperature at 25° C. for .25 hour prior to coating onto 4"×12"×24 guage (101.6 mm×304,8 mm×0.63 mm) untreated cold rolled steel panels. The panels are cured at ambient temperature for seven (7) days prior to testing. These cured, coated panels are then tested for chemical resistance (glacial acetic acid) accoring to the above described procedure. The results are given in the following Table V.

TABLE V

| Sample Number | Thickness (mil/mm) | Glacial Acetic Acid Resistance (sec) |
|---|---|---|
| A | 1.68/0.043 | 182 |
| B | 1.68/0.043 | 243 |
| C | 1.61/0.041 | 84 |
| B | 1.79/0.045 | 263 |

*Not an example of the present invention.

Pigmented coatings are prepared and tested by the procedure described in example 6. The coating formulations and test results after curing the coated panels for 14 days at ambient temperature are given in Table VI.

TABLE VI

| Component & Property | Sample Number | | | | |
|---|---|---|---|---|---|
| | A* | B | C | D | E |
| Epoxy | | | | | |

TABLE VI-continued

| Resin Type/grams | B/50 Ex 1A/50 | B/50 Ex 1B/50 | A/50 Ex 1B/50 | A/60 Ex 1B/40 | A/40 Ex 1B/60 |
|---|---|---|---|---|---|
| Amine B, gms. | 17.64 | 17.94 | 19.71 | 20.95 | 18.45 |
| TiO2, gms. | 75.9 | 75.9 | 75.9 | 75.9 | 75.9 |
| BaSO4, gms. | 175.4 | 175.4 | 175.4 | 175.4 | 175.4 |
| Bentone SD-3, gms. | 3 | 3 | 3 | 3 | 3 |
| BYK 310, gms. | 1.5 | 1.5 | 1.5 | 1.5 | 1.5 |
| BYK 052, gms. | 1.5 | 1.5 | 1.5 | 1.5 | 1.5 |
| Methyl Isobutyl Ketone, gms. | 10.16 | 10.16 | 10.16 | 10.16 | 10.16 |
| Methyl Ethyl Kentone, gms. | 20.32 | 20.32 | 20.32 | 20.32 | 20.32 |
| Butanol, gms. | 33.02 | 33.02 | 33.02 | 33.02 | 33.02 |
| Corrosion Resis to Glacial Acetic Acid, failure in hour | 0.25 | 0.45 | 0.68 | 1.33 | 0.3 |

| Component & Property | Sample No. F | G | H | I | J |
|---|---|---|---|---|---|
| Epoxy Resin Type/grams | B/50 Ex 1C/50 | B/50 Ex 1D/50 | B/50 Ex 2/50 | B/50 Ex 3/50 | B/50 Ex 7/50 |
| Amine B, gms. | 17.9 | 17.80 | 19.32 | 20.8 | 13.9 |
| TiO2, gms. | 75.9 | 75.9 | 75.9 | 785.9 | 875.9 |
| BaSO4, gms. | 175.4 | 175.4 | 175.4 | 175.4 | 175.4 |
| Bentone SD-3, gms. | 3 | 3 | 3 | 3 | 3 |
| BYK 310, gms. | 1.5 | 1.5 | 1.5 | 1.5 | 1.5 |
| BYK 052, gms. | 1.5 | 1.5 | 1.5 | 1.5 | 1.5 |
| Methyl Isobutyl Ketone, gms. | 10.16 | 10.16 | 10.16 | 10.16 | 10.16 |
| Methyl Ethyl Kentone, gms. | 20.32 | 20.32 | 20.32 | 20.32 | 20.32 |
| Butanol, gms. | 33.02 | 33.02 | 33.02 | 33.02 | 33.02 |
| Corrosion to Glacial Acetic Acid, failure in hour | 0.37 | 0.53 | 1.53 | 1.17 | 0.17 |

*Not an example of the present invention.

What is claimed is:

1. An epoxy-containing composition which comprises a mixture of
(I) a product having an average of more than one vicinal epoxide group per molecule which results from dehydrohalogenating the product resulting from reacting
  (A) a mixture of
    (1) the product resulting from reacting
      (a) at least one compound having an average of more than one aromatic hydroxyl group per molecule; with
      (b) at least one alkylene oxide having from 2 to about 4 carbon atoms per molecule in an amount which provides a ratio of moles of component (b) to aromatic hydroxyl groups contained in component (a) of from about 1:1 to about 8:1; and
    (2) at least one compound having an average of more than one aliphatic hydroxyl group per molecule which compound is free of aromatic rings, wherein components (1) and (2) are present in amounts such that from about 30 to about 70 percent of the hydroxyl groups are contributed by component (1) and from about 70 to about 30 percent of the hydroxyl groups are contributed by component (2) the percentages being based upon the total amount of hydroxyl groups contributed by components (1) and (2); with (B) at least one epihalohydrin wherein the ratio of moles of epihalohydrin per hydroxyl group contained in components (1) and )2) is from about 1.08:1 to about 1.7:1; and (II) at least one aromatic or cycloaliphatic epoxy resin having an average of more than one vicinal epoxide group per molecule and having a degree of polymerization of from about 1 to about 14.

2. A composition of claim 1 wherein
(i) in component (IA1), the ratio of moles of component (b) to aromatic hydroxyl groups contained in component (a) is from about 1.2:1 to about 3:1;
(ii) in component (IA), components (1) and (2) are present in amounts such that from about 35 to about 70 percent of the hydroxyl groups are contributed by component (1) and from about 65 to about 30 percent of the hydroxyl groups are contributed by component (2) the percentages being based upon the total amount of hydroxyl groups contributed by components (1) and (2);
(iii) the ratio of moles of epihalohydrin per hydroxyl group contained in components (IA1) and (IA2) is from about 1.2:1 to about 1.7:1; and
(iv) component (II) is employed in an amount of from about 20 to about 80 percent by weight based upon the combined weight of components (I) and (II).

3. A composition of claim 1 wherein
(i) in component (1), the ratio of moles of component (b) to aromatic hydroxyl groups contained in component (a) is from about 1.25:1 to about 2.5:1;
(ii) in component (A), components (1) and (2) are present in amounts such that from about 40 to about 67 percent of the hydroxyl groups are contributed by component (1) and from about 60 to about 33 percent of the hydroxyl groups are contributed by component (2) the percentages being based upon the total amount of hydroxyl groups contributed by components (1) and (2);
(iii) the ratio of moles of epihalohydrin per hydroxyl group contained in components (A1) and (A2) is from about 1.3:1 to about 1.5:1; and
(iv) component (II) is employed in an amount of from about 30 to about 70 percent by weight based upon the combined weight of components (I) and (II).

4. A composition of claim 1, 2 or 3 wherein
(i) component (A1a) is a biphenol or a bisphenol compound;
(ii) component (A1b) is ethylene oxide, 1,2propylene oxide or 1,2-butylene oxide;
(iii) component (A2) is a compound containing an average of more than two aliphatic hydroxyl groups per molecule; and
(iv) component (II) is a diglycidyl ether of a biphenol or a bisphenol compound having a degree of polymerization of from about 1 to about 6 or any combination of such diglycidyl ethers.

5. A composition of claim 1, 2 or 3 wherein (i) component (A1a) is bisphenol A, bisphenol F, bisphenol K, bisphenol S, bisphenol AP or any combination thereof;
(ii) component (A1b) is 1,2-propylene oxide;
(iii) component (A2) is glycerine, trimethylolpropane, or any combination thereof;
(iv) component (B) is epichlorohydrin; and
(v) component (II) is a diglycidyl ether of bisphenol A, bisphenol F, bisphenol K, bisphenol S, or bisphenol AP having a degree of polymerization of from about 1 to about 3 or any combination thereof.

6. A curable composition comprising
(I) a product having an average of more than one vicinal epoxide group per molecule which results from dehydrohalogenating the product resulting from reacting
(A) a mixture of
(1) the product resulting from reacting
(a) at least one compound having an average of more than one aromatic hydroxyl group per molecule; with
(b) at least one alkylene oxide having from 2 to about 4 carbon atoms per molecule in an amount which provides a ratio of moles of component (b) to aromatic hydroxyl groups contained in component (a) of from about 1:1 to about 8:1; and
(2) at least one compound having an average of more than one aliphatic hydroxyl group per molecule which compound is free of aromatic rings, wherein components (1) and (2) are present in amounts such that from about 30 to about 70 percent of the hydroxyl groups are contributed by component (1) and from about 70 to about 30 percent of the hydroxyl groups are contributed by component (2) the percentages being based upon the total amount of hydroxyl groups contributed by components (1) and (2); with (B) at least one epihalohydrin wherein the ratio of moles of epihalohydrin per hydroxyl group contained in components (A1) and (A2) is from about 1.08:1 to about 1.7:1;
(II) at least one aromatic or cycloaliphatic epoxy resin having an average of more than one vicinal epoxide group per molecule and having a degree of polymerization of from about 1 to about 14; and
(III) a curing amount of at least one curing agent or curing catalyst for components (I) and (II).

7. A curable composition of claim 6 wherein
(i) in component (IA1), the ratio of moles of component (b) to aromatic hydroxyl groups contained in component (a) is from about 1.2:1 to about 3:1;
(ii) in component (IA), components (1) and (2) are present in amounts such that from about 35 to about 70 percent of the hydroxyl groups are contributed by component (1) and from about 65 to about 30 percent of the hydroxyl groups are contributed by component (2) the percentages being based upon the total amount of hydroxyl groups contributed by components (1) and (2);
(iii) the ratio of moles of epihalohydrin per hydroxyl group contained in components (IA1) and (IA2) is from about 1.2:1 to about 1.7:1; and
(iv) component (II) is employed in an amount of from about 20 to about 80 percent by weight based upon the combined weight of components (I) and (II).

8. A curable composition of claim 6 wherein
 (i) in component (1), the ratio of moles of component (b) to aromatic hydroxyl groups contained in component (a) is from about 1.25:1 to about 2.5:1;
 (ii) in component (A), components (1) and (2) are present in amounts such that from about 40 to about 67 percent of the hydroxyl groups are contributed by component (1) and from about 60 to about 33 percent of the hydroxyl groups are contributed by component (2) the percentages being based upon the total amount of hydroxyl groups contributed by components (1) and (2);
 (iii) the ratio of moles of epihalohydrin per hydroxyl group contained in components (A1) and (A2) is from about 1.3:1 to about 1.5:1; and
 (iv) component (II) is employed in an amount of from about 30 to about 70 percent by weight based upon the combined weight of components (I) and (II).

9. A curable composition of claim 6, 7 or 8 wherein
 (i) component (A1a) is a biphenol or a bisphenol compound;
 (ii) component (A1b) is ethylene oxide, 1,2propylene oxide or 1,2-butylene oxide;
 (iii) component (A2) is a compound containing an average of more than two aliphatic hydroxyl groups per molecule;
 (iv) component (II) is a diglycidyl ether of a biphenol or a bisphenol compound having a degree of polymerization of from about 1 to about 6 or any combination of such diglycidyl ethers; and
 (v) component (III) is an aliphatic or aromatic polyamine, polyamide, polysulfide, a polycarboxylic acid or anhydride thereof, a compound containing a plurality of aromatic hydroxyl groups, or any combination thereof.

10. A curable composition of claim 6, 7 or 8 wherein
 (i) component (A1a) is bisphenol A, bisphenol F, bisphenol K, bisphenol S, bisphenol AP or any combination thereof;
 (ii) component (A1b) is 1,2-propylene oxide;
 (iii) component (A2) is glycerine, trimethylolpropane, or any combination thereof;
 (iv) component (B) is epichlorohydrin;
 (v) component (II) is a diglycidyl ether of bisphenol A, bisphenol F, bisphenol K, bisphenol S, or bisphenol AP having a degree of polymerization of from about 1 to about 3 or any combination thereof; and
 (vi) component (III) is a polyalkylene polyamine, an amidoamine prepared by reacting at least one fatty acid with at least one polyamine, or any combination thereof.

11. The product resulting from curing the curable composition of claim 6, 7, or 8.

12. The product resulting from curing the curable composition of claim 9.

13. The product resulting from curing the curable composition of claim 10.

* * * * *